United States Patent
Humby et al.

(10) Patent No.: US 7,801,862 B1
(45) Date of Patent: Sep. 21, 2010

(54) RETENTION OF COMPLEX OBJECTS

(75) Inventors: David Humby, Richmond (CA); David Mennie, Ottawa (CA); Steve Sauder, Ottawa (CA); John-David Dorman, Ottawa (CA)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/540,503

(22) Filed: Sep. 29, 2006

(51) Int. Cl.
*G06F 7/00* (2006.01)
*G06F 17/00* (2006.01)

(52) U.S. Cl. .................. 707/662; 707/694; 707/899

(58) Field of Classification Search ............... 707/1, 707/103, 200, 203, 204, 999.001, 999.103, 707/999.203, 999.204, 662.694, 899
See application file for complete search history.

(56) References Cited

U.S. PATENT DOCUMENTS

| | | | |
|---|---|---|---|
| 6,128,661 A | 10/2000 | Flanagin et al. | |
| 6,430,666 B1 | 8/2002 | Roth | |
| 6,505,212 B2 * | 1/2003 | Nakano et al. | 707/200 |
| 6,553,365 B1 | 4/2003 | Summerlin et al. | |
| 6,609,138 B1 | 8/2003 | Merriam | |
| 6,915,435 B1 | 7/2005 | Merriam | |
| 7,003,551 B2 | 2/2006 | Malik | |
| 7,027,463 B2 | 4/2006 | Mathew et al. | |
| 7,107,298 B2 | 9/2006 | Prahlad et al. | |
| 7,107,416 B2 | 9/2006 | Stuart et al. | |
| 7,117,322 B2 | 10/2006 | Hochberg et al. | |
| 7,146,388 B2 | 12/2006 | Stakutis et al. | |
| 7,149,738 B2 | 12/2006 | Kumar et al. | |
| 7,155,466 B2 | 12/2006 | Rodriguez et al. | |
| 7,159,074 B2 | 1/2007 | Kihara et al. | |
| 7,171,433 B2 | 1/2007 | Wolfe et al. | |
| 7,233,959 B2 | 6/2007 | Kanellos et al. | |
| 7,293,027 B2 | 11/2007 | Margolus | |
| 7,318,072 B2 | 1/2008 | Margolus et al. | |
| 7,493,350 B2 | 2/2009 | Episale et al. | |
| 2003/0088591 A1 | 5/2003 | Fish | |
| 2003/0090531 A1 | 5/2003 | Wong et al. | |
| 2003/0208608 A1 | 11/2003 | Merriam | |
| 2003/0225801 A1 | 12/2003 | Devarakonda et al. | |
| 2003/0236788 A1 | 12/2003 | Kanellos et al. | |
| 2004/0019614 A1 | 1/2004 | Wang | |
| 2004/0167943 A1 | 8/2004 | Margolus | |
| 2004/0193740 A1 | 9/2004 | Kasmirsky et al. | |
| 2005/0076066 A1 | 4/2005 | Stakutis et al. | |
| 2005/0132010 A1 | 6/2005 | Muller | |

(Continued)

OTHER PUBLICATIONS

U.S. Appl. No. 11/370,604, Kilday et al.

(Continued)

*Primary Examiner*—James Trujillo
*Assistant Examiner*—Bruce M Moser
(74) *Attorney, Agent, or Firm*—Van Pelt, Yi & James LLP

(57) ABSTRACT

Retention of complex objects is disclosed. An indication is received that retention applied to a root object of a complex object is to be extended to child objects, such as attachments or included files or other content. A snapshot of at least the child objects is stored and the retention that is applied to the root object is extended to the snapshot. Retention of the snapshot ensures that the child objects are retained, so long as and in the same manner as the root object, in the form (e.g., version) in which they are stored at the time retention is applied to the snapshot.

29 Claims, 7 Drawing Sheets

U.S. PATENT DOCUMENTS

| | | |
|---|---|---|
| 2005/0165734 A1 | 7/2005 | Vicars et al. |
| 2005/0192830 A1 | 9/2005 | Pugh et al. |
| 2005/0193043 A1 | 9/2005 | Hoover |
| 2005/0216745 A1 | 9/2005 | Speare et al. |
| 2005/0273858 A1 | 12/2005 | Zadok et al. |
| 2005/0283461 A1 | 12/2005 | Sell et al. |
| 2006/0004689 A1 | 1/2006 | Chandrasekaran et al. |
| 2006/0010301 A1 | 1/2006 | Yagawa |
| 2006/0026220 A1* | 2/2006 | Margolus .................. 707/204 |
| 2006/0031351 A1 | 2/2006 | Marston et al. |
| 2006/0101384 A1 | 5/2006 | Sim-Tang et al. |
| 2006/0149735 A1 | 7/2006 | DeBie et al. |
| 2006/0156382 A1 | 7/2006 | Motoyama |
| 2006/0224626 A1 | 10/2006 | Lakshminath et al. |
| 2006/0230044 A1 | 10/2006 | Utiger |
| 2006/0259468 A1 | 11/2006 | Brooks et al. |
| 2007/0033200 A1 | 2/2007 | Gillespie |
| 2007/0088715 A1 | 4/2007 | Slackman et al. |
| 2007/0094311 A1 | 4/2007 | Pelletier et al. |
| 2007/0162467 A1 | 7/2007 | Wolber et al. |
| 2007/0185914 A1 | 8/2007 | Prahlad et al. |

OTHER PUBLICATIONS

U.S. Appl. No. 11/370,421, Kilday et al.
U.S. Appl. No. 11/371,147, Kilday et al.
Cohasset Associates, Inc., Compliance Requirements Assessment, Oct. 2004, White Paper, pp. 1-54.
Wel-Dong Zhu, E-mail Archiving and Records Management Integration Solution Guide, Jan. 2006, IBM, 5$^{th}$ Edition.

* cited by examiner

RETENTION OF COMPLEX OBJECTS

BACKGROUND OF THE INVENTION

Content management systems manage and provide access to content items stored in a repository. Some content management systems use stored metadata to track, manage, and provide access to content items store in an associated repository. In some cases, retention functionality is provided, e.g., to ensure that a document or other content item is retained for a required and/or desired period and subsequently disposed of in a prescribed way. A simple "document" or other logical stored object may in some cases include multiple components each stored in the repository as a separate content item, e.g., an email and its attachment or a primary document and one or more other content items incorporate or included in the primary document. A logical stored object that includes two or more content items stored and tracked separately by a content management system are referred to herein as a "virtual document" and/or a "complex object". Depending on the needs of a particular user, enterprise, etc., different requirements may apply in terms of whether and how retention applied to a primary or root node of a complex object is applied as well to children of the root node. Therefore, there is a need for a flexible and effective way to apply retention to complex objects.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Retention of complex objects is disclosed. An indication is received that retention applied to a root object of a complex object is to be extended to child objects, such as attachments or included files or other content. A snapshot of at least the child objects is stored and the retention that is applied to the root object is extended to the snapshot. Retention of the snapshot ensures that the child objects are retained, so long as and in the same manner as the root object, in the form (e.g., version) in which they are stored at the time retention is applied to the snapshot.

Figure 1:
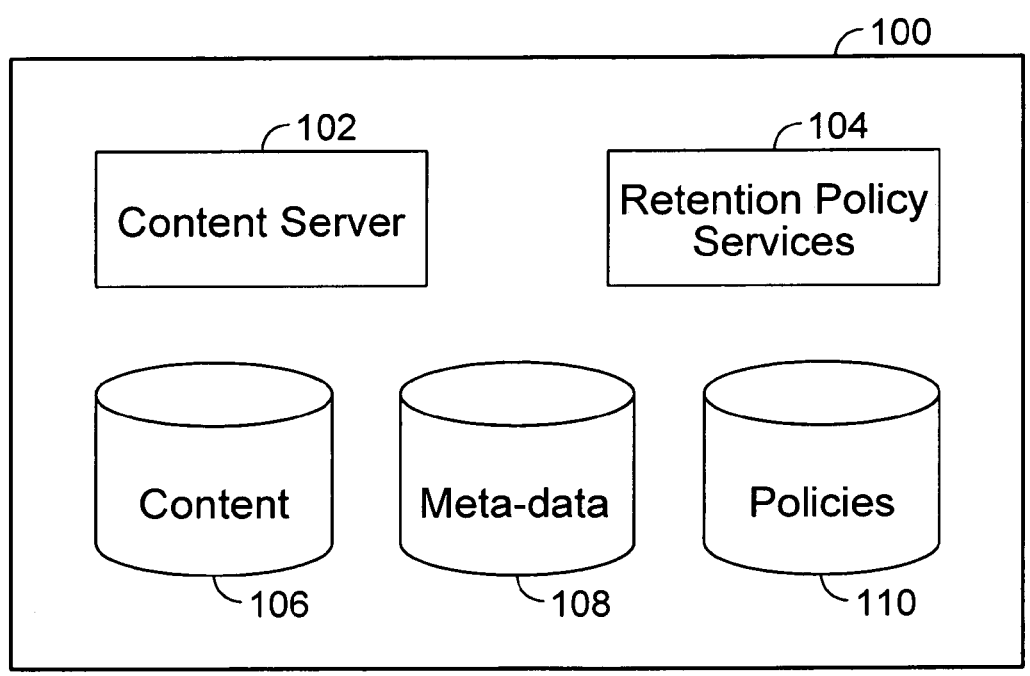
FIG. 1 is a block diagram illustrating an embodiment of a content management system.

FIG. 1 is a block diagram illustrating an embodiment of a content management system. In the example shown, content management system 100 includes a content server 102 configured to provide access to content items stored in a content store 106. Content stored in content store 106 is represented by metadata in metadata store 108, which metadata is used by content server 102 in some embodiments to provide access to content items stored in content store 106. Retention policy services 104 includes business logic configured to apply and enforce retention policies with respect to objects stored in content store 106. In some embodiments, retention of a content item is realized at least in part by associating one or more retention related objects with a metadata object that represents the content item in metadata store 108. One or more such objects in some embodiments identifies a retention policy stored in a policy store 110.

In the case of a complex object, a need arises to determine whether and how retention applied to a root object of the complex object is to be applied as well to child objects of the root object. In some cases, it may be desired that only the root object be retained. In other cases, it may be desired that both the root object and child objects be retained in the form in which they exist at the time retention is applied, with no need or desire to retain subsequent versions of attached or included child objects that are not required to be retained as part of a subsequent version of the complex object. Flexible and configurable retention of complex objects is disclosed. In some embodiments, a snapshot of the child objects of a complex object is taken and the same retention applied to the root object is extended to the snapshot, ensuring that the same retention is applied to all components of the complex object without necessarily and possibly needlessly applying retention of subsequent versions of the child objects, as may occur, for example, if each child object were simply associated directly with a retainer object configured to ensure retention of the root object.

Figure 2:
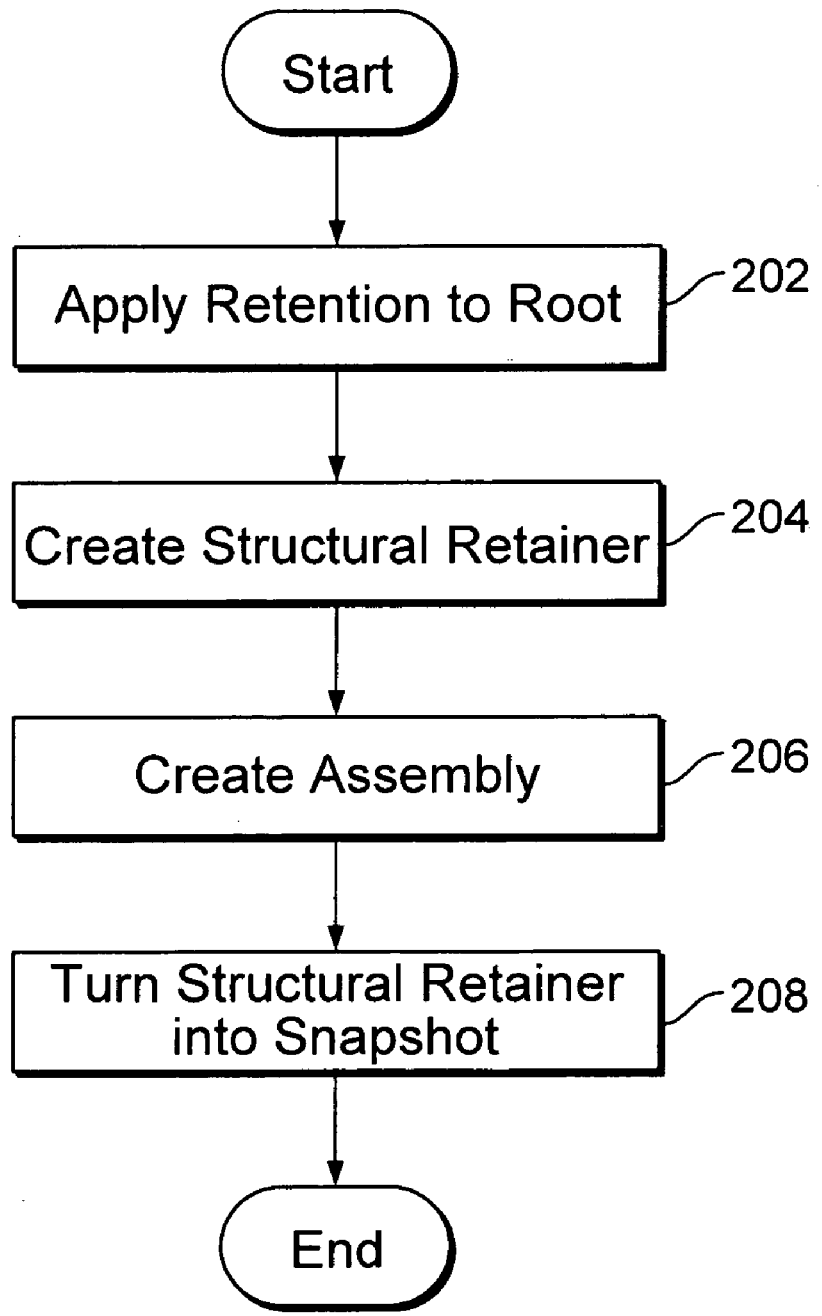
FIG. 2 is a flow chart illustrating an embodiment of a process for retaining a complex object.

FIG. 2 is a flow chart illustrating an embodiment of a process for retaining a complex object. In the example shown, retention is applied to a root object of a complex object (202). A structural retainer object is instantiated and associated with a retainer object used to apply retention to the root object (204). An assembly object that associates the child objects of the complex object with the root object is created and configured (206). The structural retainer is converted into a snapshot configured to store the child objects comprising the assembly in the form (e.g., version) in which they exist at the time the structural retainer is converted into a snapshot (208). In some embodiments, one or more attributes of a system object of which the structural retainer object is a child object are populated with appropriate values to convert the system object from a structural retainer object to a snapshot object. Examples of such attributes include attributes indicating that the associated assembly is "frozen" (i.e., the complex object with its current structure/components and content will be retained, even if the structure of the complex object and/or the content, e.g., of one of the child objects, is subsequently changed), and one or more flags indicating that the snapshot and associated components are frozen. In some embodiments, the process of FIG. 2 results in a respective retainer attribute of each child object pointing to the structural retainer/snapshot, which in turn is linked to a retainer object configured to ensure retention of the root object, with the result that the root object, and the child objects in the form in which they exist at the time the snapshot is frozen, are retained together.

Figure 3:
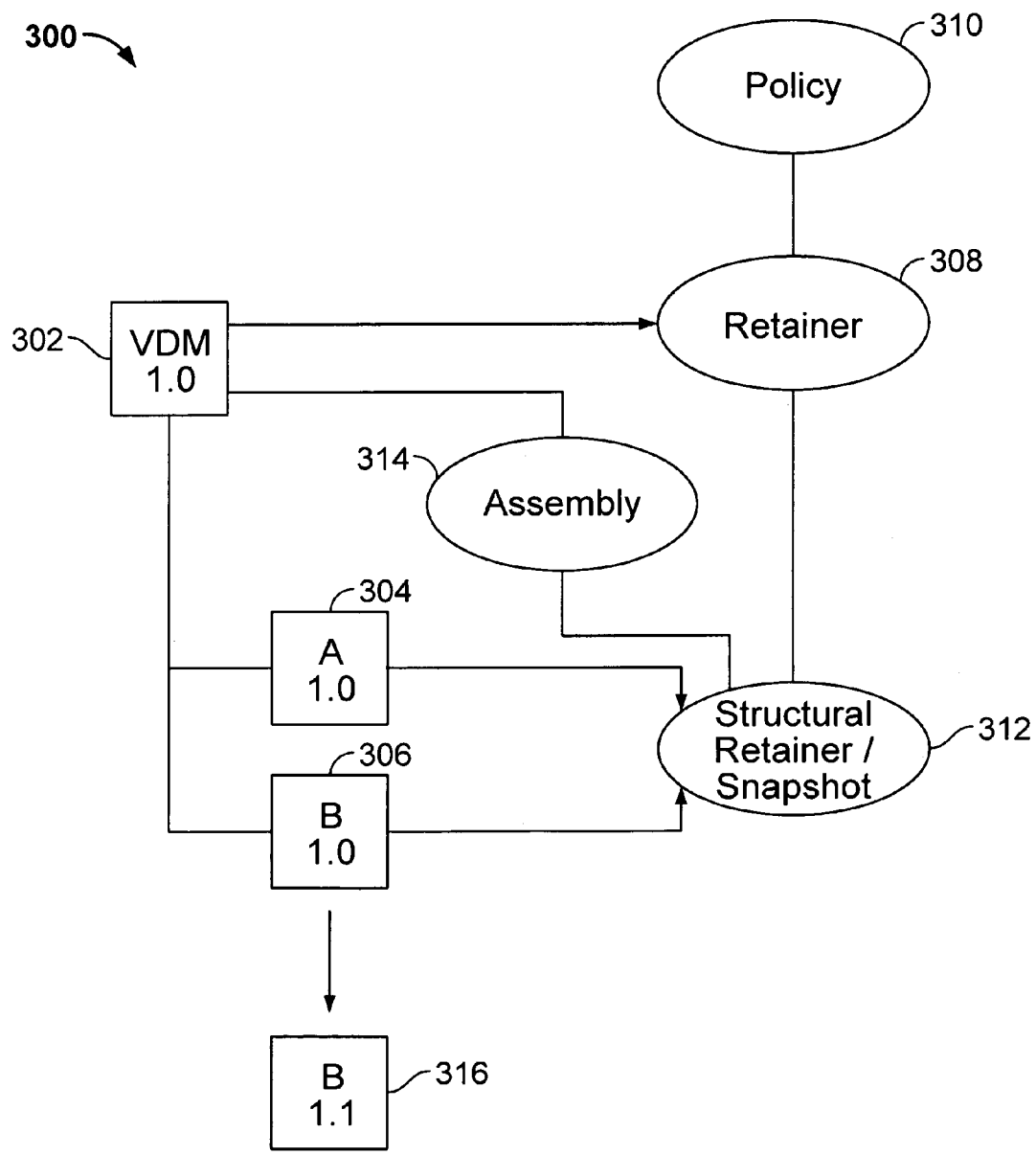
FIG. 3 is a block diagram illustrating an embodiment of retention of a complex object.

FIG. 3 is a block diagram illustrating an embodiment of retention of a complex object. In some embodiments, the objects and relationships shown in FIG. 3 is achieved by executing the process of FIG. 2. In the example shown, the complex object 300 includes a root object 302, designated "VDM" (virtual document) version 1.0, and two child nodes 304 (item A, version 1.0) and 306 (item B, version 1.0). Retention has been applied to root object 302 by associating with root object 302 a retainer object 308 linked to a retention policy instance (object) 310. In various embodiments, whether the retention policy 310 is to be applied as well to the child objects 304 and 306 is determined at least in part by one or more attributes of retention policy 310, retainer object 308, and/or business and/or application logic and/or processes. In the example shown, the retention policy 310 has been extended to the child objects 304 and 306 by instantiating a structural retainer object 312 linked to retainer object 308, creating an assembly object 314 that represents the relationship between the root object 302 and child objects 304 and 306, and turning the structural retainer object 312 into a snapshot object that freezes as a snapshot the complex object comprising root object 302 and child objects 304 and 306 with the structure and content as they existed at the time the snapshot is frozen. Note that a subsequent version 316 of item B (version 1.1) is not subject to the retention applied to the complex object 300, as would have occurred in some embodiments if the child objects 304 and 306 had simply been linked directly to retainer object 308 and/or policy 310 The arrangement shown in FIG. 3 results in the child objects 304 and 306 being retained in the same manner as the root object 302, due to the link between structural retainer/snapshot object 312 and retainer object 308.

Figure 4:
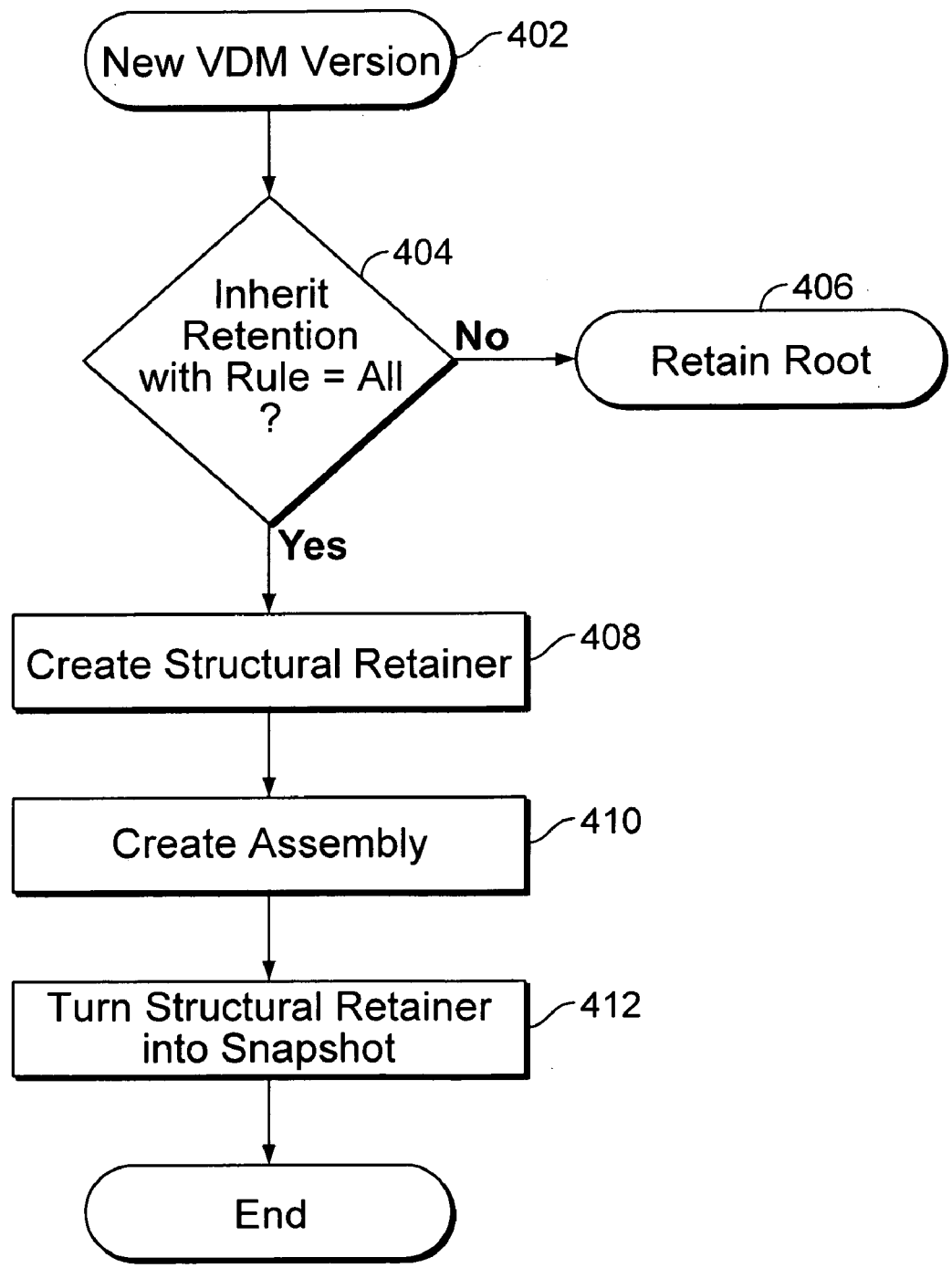
FIG. 4 is a flow chart illustrating an embodiment of a process for extending retention to a subsequent version of a complex object.

FIG. 4 is a flow chart illustrating an embodiment of a process for extending retention to a subsequent version of a complex object. An indication that a new version of the complex object is to be and/or has been saved is received (402). If the new version is to inherit retention associated, for example, with a container in which the new version is or is to be stored and/or from a prior version of the complex object, as indicated for example by an attribute of a retention policy and/or retainer object associated with the container and/or prior version (404), a new retainer object and retention policy instance is created for the new version of the root object, a new structural retainer is created to provide for retention of the child objects as components of the new version of the complex object (408), a new assembly object is created to define the components of the new version of the complex object (410), and the structural retainer is converted into a snapshot configured to ensure retention of the child objects as components of the new version of the complex object (412). Otherwise (404), retention (as applicable) is applied just to the root object (406).

Figure 5:
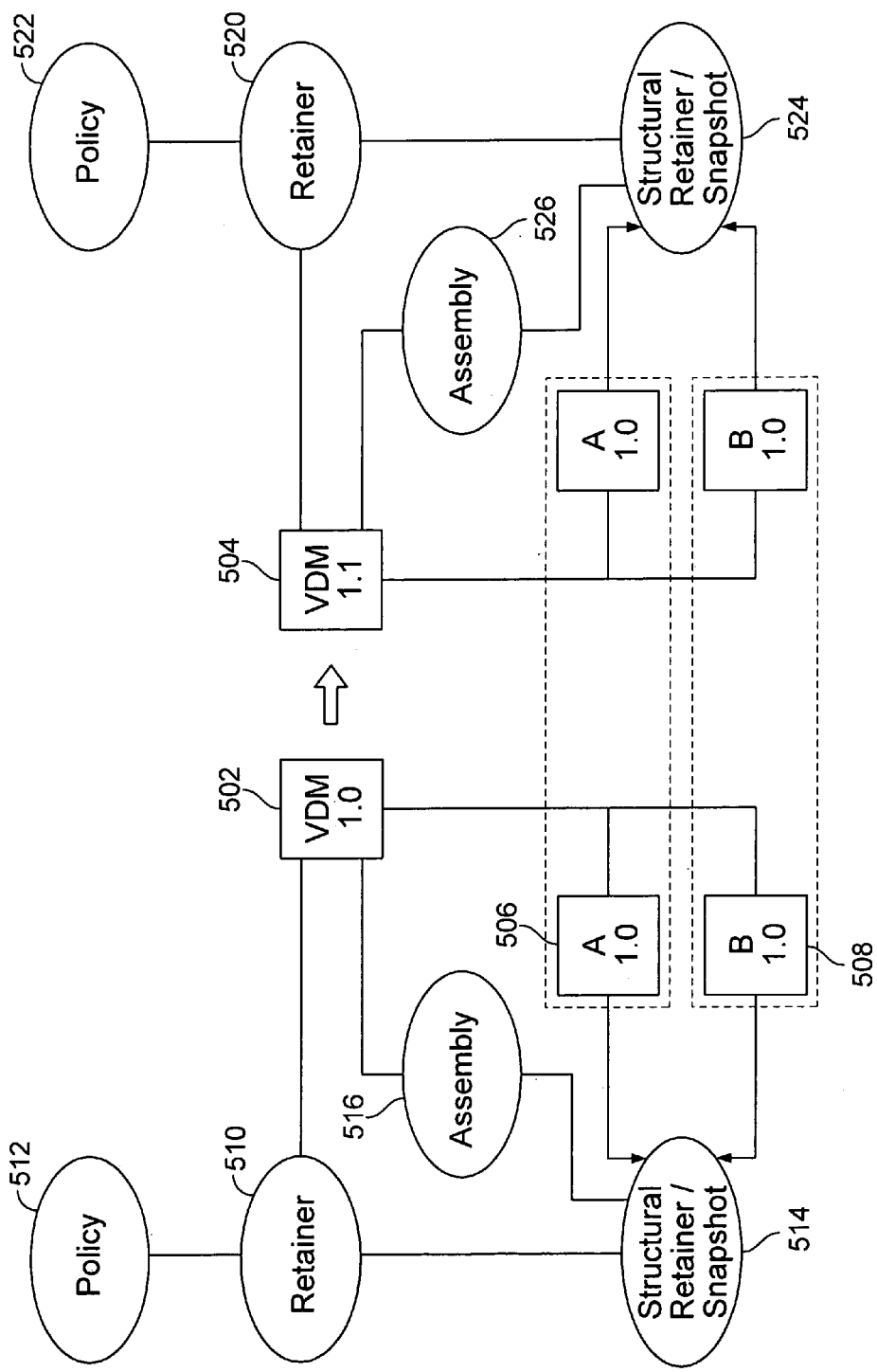
FIG. 5 is a block diagram illustrating an embodiment of retention of a subsequent version of a complex object to which retention has been applied.

FIG. 5 is a block diagram illustrating an embodiment of retention of a subsequent version of a complex object to which retention has been applied. In some embodiments, the arrangement shown in FIG. 5 is an example of retention achieved through the process of FIG. 4. A first version of a complex object comprising a first version 1.0 of a root object 502 and child objects 506 and 508 is saved as a new version of the complex object comprising a subsequent version 1.1 of the root object 504, with the same child objects 506 and 508 as the prior version (i.e., the same version of the same child objects). In the example shown, retention has been applied to the prior version of the complex object by operation of a retainer object 510 and associated policy instance 512 associated with the root object 502, and a structural retainer/snapshot object 514 and assembly object 516 configured to extend retention in accordance with policy 512 to the child objects 506 and 508 as components of the prior version (of which root object 502 is the root). A separate retainer object 520 and policy instance 522 have been created to ensure retention of the root object 504 of the new version of complex object. Likewise, a new structural retainer/snapshot object 524 and assembly object 526 have been created to ensure the child objects 506 and 508 are retained, along with root object 504, as components of the new version of the complex object, of which root object 504 is the root. Note that in this manner retention is applied separately to the same version of the child objects 506 and 508, once as components of the prior version of the complex object and again as components of the new version—i.e., the same child objects point to two structural retainers. In some embodiments, this approach ensures that the child objects will be retained at least until disposition of the last complex object of which they are components, i.e., the last structural (or other) retainer to which they are linked has been removed and/or advanced to and qualified for completion of a final phase of retention.

Figure 6:
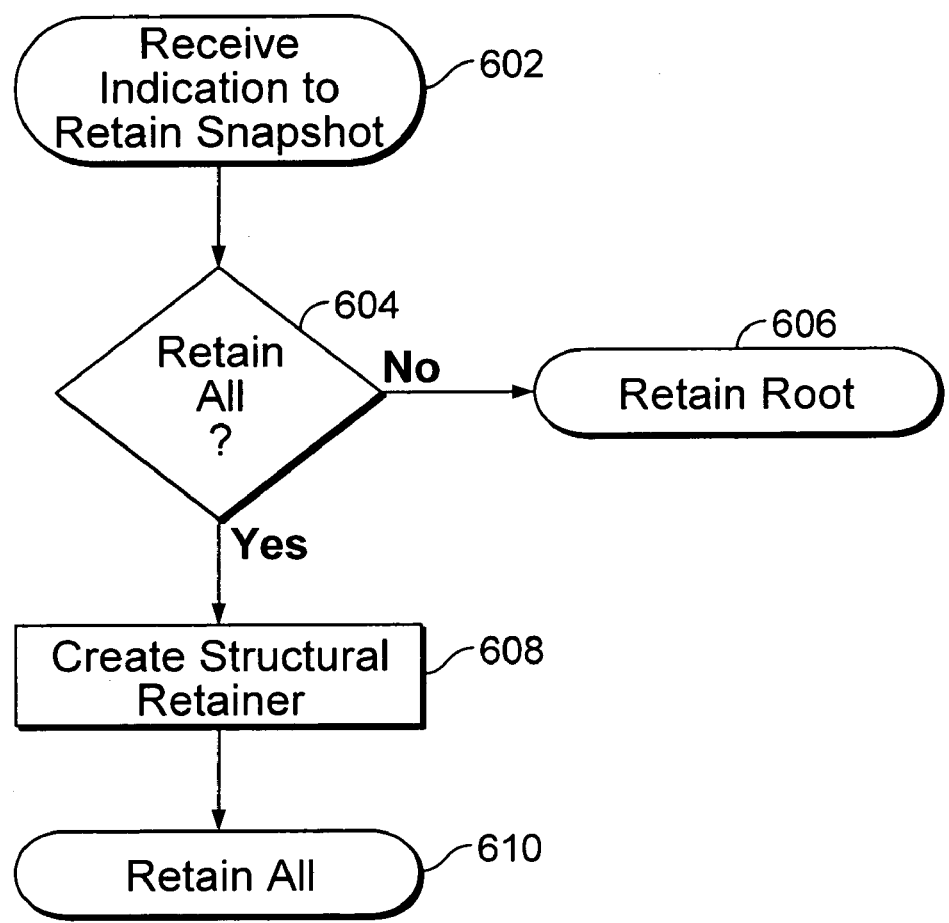
FIG. 6 is a flow chart illustrating an embodiment of a process for retaining an existing snapshot.

FIG. 6 is a flow chart illustrating an embodiment of a process for retaining an existing snapshot. In the example shown, an indication is received that retention is to be applied to an existing snapshot (602). Examples of such an indication include an indication that the snapshot has been moved to a physical and/or logical storage location with which the retention policy is associated. It is determined whether the retention policy is to be applied to the entire snapshot or just the root object (604). If retention is to be applied to just the root object, only the root object is retained (606). Otherwise, a structural retainer is created (608) and configured to provide retention of all components of the snapshot (610).

Figure 7:
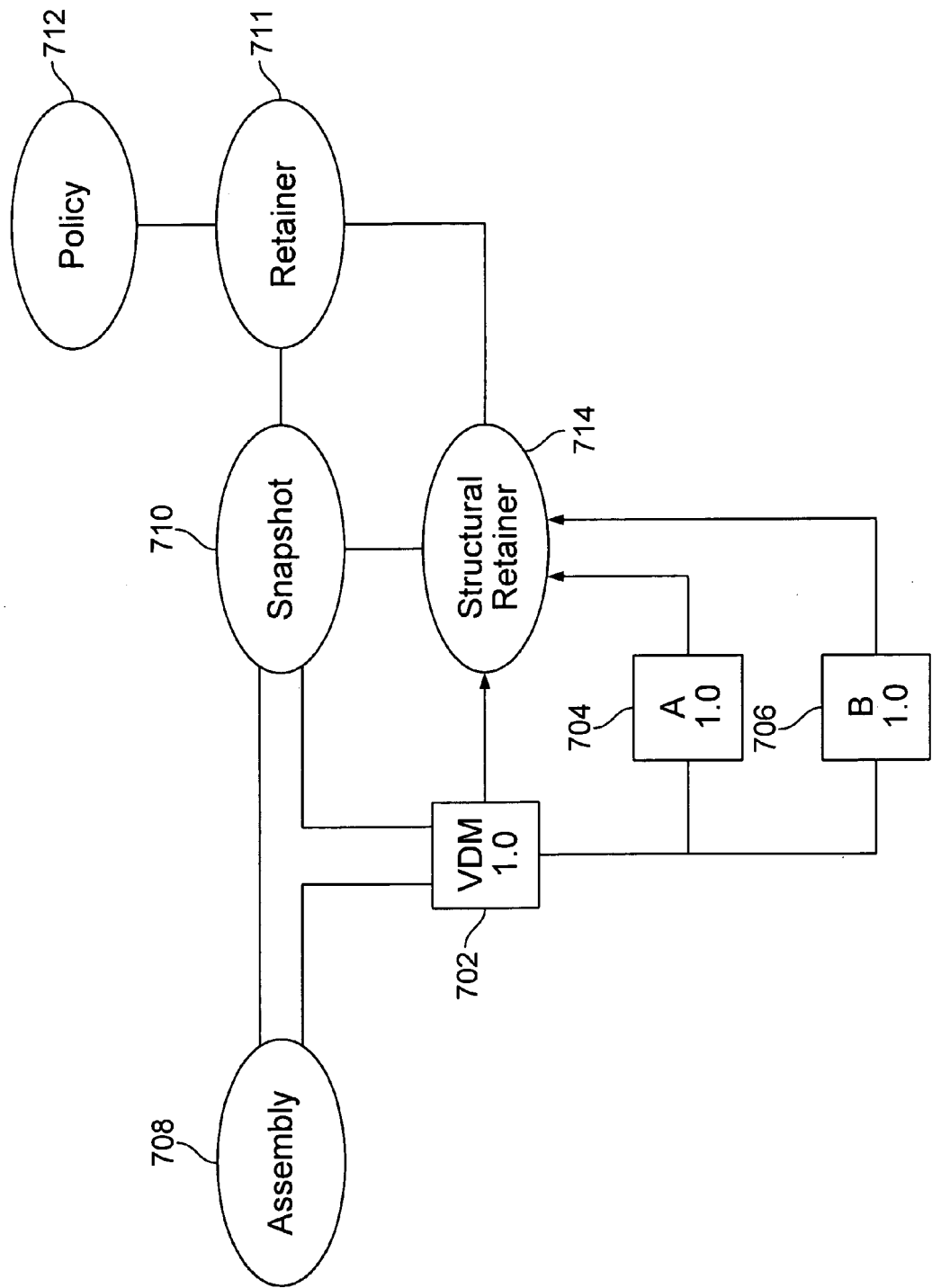
FIG. 7 is a block diagram illustrating an embodiment of retention of a snapshot.

FIG. 7 is a block diagram illustrating an embodiment of retention of a snapshot. In some embodiments, FIG. 7 shows the result achieved by the process of FIG. 6. In the example shown, a complex object comprising a root object 702 and child objects 704 and 706 has been saved as a snapshot by associating with the components of the complex object and assembly object 708 configured to identify the components of the complex object and a snapshot object 710 configured to freeze the assembly. Retention has been applied to the snapshot by associating a retainer object 711 and policy instance 712 with snapshot object 710, and realized by creating a structural retainer 714 that is linked to snapshot object 710 and retainer object 711 with the result that the components of the complex object, i.e., root object 702 and child objects 704 and 706, point to and are retained by operation of structural retainer 714

The approaches described herein ensure that components of a complex object are retained together to the extent and in the manner desired, without extending retention to objects and/or versions not required to be retained. Flexibility is provided to enable an administrator and/or other user to control whether and how retention applied to a root object of a complex object is extended to child objects included in the complex object.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of retaining a complex object, comprising:
using a processor to receive an indication that a retention policy applied to a root content object of a complex object is to be extended to one or more child objects of the complex object,
wherein the complex object comprises a logical stored object that includes a plurality of content items including at least the root content object and the one or more child objects, each of which is stored and tracked separately by a content management system configured to store the complex object, and
wherein applying the retention policy to a content item includes ensuring that the content item is retained for a specified period and ensuring that the content item is subsequently disposed of in a prescribed way;
creating and storing a snapshot of at least the current versions of the one or more child objects in a storage; and
using a processor to apply the retention policy to the snapshot, wherein retention of the snapshot ensures that a content comprising the one or more child objects, as the content existed at a time of the snapshot, is retained so long as the root content object is retained and in the same manner as the root content object is retained even if the one or more child objects are not retained.

2. A method as recited in claim 1, wherein receiving an indication that the retention policy is to be applied to the one or more child objects comprises determining that the retention policy has been associated with a root content object of the complex object and that the retention policy includes an indication that application of the retention policy is to be extended to any child objects of an object to which the retention policy is applied.

3. A method as recited in claim 1, wherein receiving an indication that the retention policy is to be applied to the one or more child objects comprises receiving an indication that the retention policy is to be applied to an existing snapshot comprising the one or more child objects.

4. A method as recited in claim 3, wherein the existing snapshot includes a root content object of the complex object.

5. A method as recited in claim 1, wherein the retention policy has been applied to a root content object of the complex object and the snapshot does not include the root content object.

6. A method as recited in claim 1, wherein creating the snapshot comprises creating a structural retainer object configured to provide for retention of the one or more child objects as components of the complex object, creating an assembly object configured to identify the one or more child objects as components of the complex object, and converting the structural retainer object into a snapshot object associated with the assembly object.

7. A method as recited in claim 6, further comprising linking the structural retainer object to the retention policy.

8. A method as recited in claim 7, wherein linking the structural retainer object to the retention policy comprises linking the structural retainer object to an existing retainer object linked to an instance of the retention policy and configured to apply the retention policy to a root content object of the complex object.

9. A method as recited in claim 1, wherein the complex object comprises a primary document and one or more attachments.

10. A method as recited in claim 1, wherein the complex object comprises a primary document and one or more content items incorporated into the primary document.

11. A method as recited in claim 1, wherein application of the retention policy is not extended to subsequent versions of the one or more child objects.

12. A method as recited in claim 1, further comprising receiving an indication that a new version of the complex object has been or is desired to be saved.

13. A method as recited in claim 12, wherein the snapshot comprises a first snapshot; and further comprising applying the retention policy to a second snapshot of at least the one or more child objects as components of the new version.

14. A method as recited in claim 13, wherein each of the one or more child objects is linked to both a first retainer object associated with the first snapshot and a second retainer associated with the second snapshot.

15. A method as recited in claim 1, wherein the snapshot comprises the one or more child objects in the form in which they exist at the time the snapshot is frozen.

16. A content management system, comprising:
a storage configured to store a complex object; and
a processor configured to
receive an indication that a retention policy applied to a root content object of a complex object is to be extended to one or more child objects of the complex object,
wherein the complex object comprises a logical stored object that includes a plurality of content items including at least the root content object and the one or more child objects, each of which is stored and tracked separately by the content management system configured to store the complex object, and
wherein applying the retention policy to a content item includes ensuring that the content item is retained for a specified period and ensuring that the content item is subsequently disposed of in a prescribed way;
create and store a snapshot of at least the current versions of the one or more child objects in the storage; and
apply the retention policy to the snapshot, wherein retention of the snapshot ensures that a content comprising the one or more child objects, as the content existed at a time of the snapshot, is retained so long as the root content object is retained and in the same manner as the root content object is retained even if the one or more child objects are not retained.

17. A content management system as recited in claim 16, wherein to receive an indication that the retention policy is to be applied to the one or more child objects comprises determining that the retention policy has been associated with a root content object of the complex object and that the retention policy includes an indication that application of the retention policy is to be extended to any child objects of an object to which the retention policy is applied.

18. A content management system as recited in claim 16, wherein to receive an indication that the retention policy is to be applied to the one or more child objects comprises receiving an indication that the retention policy is to be applied to an existing snapshot comprising the one or more child objects.

19. A content management system as recited in claim 16, wherein to create the snapshot comprises creating a structural retainer object configured to provide for retention of the one or more child objects as components of the complex object, creating an assembly object configured to identify the one or more child objects as components of the complex object, and converting the structural retainer object into a snapshot object associated with the assembly object.

20. A content management system as recited in claim 16, wherein the complex object comprises a primary document and one or more attachments.

21. A content management system as recited in claim 16, wherein application of the retention policy is not extended to subsequent versions of the one or more child objects.

22. A content management system as recited in claim 16, wherein the processor is further configured to receive an indication that a new version of the complex object has been or is desired to be saved.

23. A computer program product for retaining a complex object, the computer program product being embodied in a computer readable storage medium and comprising computer instructions for:

receiving an indication that a retention policy applied to a root content object of a complex object is to be extended to one or more child objects of the complex object, wherein the complex object comprises a logical stored object that includes a plurality of content items including at least the root content object and the one or more child objects, each of which is stored and tracked separately by a content management system configured to store the complex object, and wherein applying the retention policy to a content item includes ensuring that the content item is retained for a specified period and ensuring that the content item is subsequently disposed of in a prescribed way;

creating and storing a snapshot of at least the current versions of the one or more child objects in a storage; and applying the retention policy to the snapshot, wherein retention of the snapshot ensures that a content comprising the one or more child objects, as the content existed at a time of the snapshot, is retained so long as the root content object is retained and in the same manner as the root content object is retained even if the one or more child objects are not retained.

24. A computer program product as recited in claim 23, wherein receiving an indication that the retention policy is to be applied to the one or more child objects comprises determining that the retention policy has been associated with a root content object of the complex object and that the retention policy includes an indication that application of the retention policy is to be extended to any child objects of an object to which the retention policy is applied.

25. A computer program product as recited in claim 23, wherein receiving an indication that the retention policy is to be applied to the one or more child objects comprises receiving an indication that the retention policy is to be applied to an existing snapshot comprising the one or more child objects.

26. A computer program product as recited in claim 23, wherein creating the snapshot comprises creating a structural retainer object configured to provide for retention of the one or more child objects as components of the complex object, creating an assembly object configured to identify the one or more child objects as components of the complex object, and converting the structural retainer object into a snapshot object associated with the assembly object.

27. A computer program product as recited in claim 23, wherein the complex object comprises a primary document and one or more attachments.

28. A computer program product as recited in claim 23, wherein application of the retention policy is not extended to subsequent versions of the one or more child objects.

29. A computer program product as recited in claim 23, further comprising receiving an indication that a new version of the complex object has been or is desired to be saved.

* * * * *